United States Patent
George

(10) Patent No.: US 12,525,599 B2
(45) Date of Patent: Jan. 13, 2026

(54) MANUFACTURING BATTERY ELECTRODES

(71) Applicant: Our Next Energy, Inc., Novi, MI (US)

(72) Inventor: Najah George, Farmington Hills, MI (US)

(73) Assignee: Our Next Energy, Inc., Novi, MI (US)

( * ) Notice: Subject to any disclaimer, the term of this patent is extended or adjusted under 35 U.S.C. 154(b) by 0 days.

(21) Appl. No.: 18/083,056

(22) Filed: Dec. 16, 2022

(65) Prior Publication Data

US 2023/0197920 A1 Jun. 22, 2023

Related U.S. Application Data

(60) Provisional application No. 63/265,829, filed on Dec. 21, 2021.

(51) Int. Cl.
| | | |
|---|---|---|
| *B22F 12/00* | (2021.01) | |
| *H01M 4/04* | (2006.01) | |
| *H01M 4/02* | (2006.01) | |
| *H01M 4/505* | (2010.01) | |
| *H01M 4/58* | (2010.01) | |
| *H01M 4/587* | (2010.01) | |
| *H01M 4/62* | (2006.01) | |

(52) U.S. Cl.
CPC .... *H01M 4/0404* (2013.01); *H01M 2004/027* (2013.01); *H01M 2004/028* (2013.01); *H01M 4/505* (2013.01); *H01M 4/5825* (2013.01); *H01M 4/587* (2013.01); *H01M 4/622* (2013.01)

(58) Field of Classification Search
CPC ......... B33Y 10/00; B33Y 30/00; B33Y 50/00; B33Y 50/02; B29C 64/156; B29C 64/264; B29C 64/268; B29C 64/273; B29C 64/393; B22F 12/00; B22F 12/41; B22F 12/90

See application file for complete search history.

(56) References Cited

U.S. PATENT DOCUMENTS

| | | |
|---|---|---|
| 8,294,060 B2 | 10/2012 | Mohanty |
| 8,728,176 B2 | 5/2014 | Li |

(Continued)

FOREIGN PATENT DOCUMENTS

| | | |
|---|---|---|
| CN | 108365173 | 8/2018 |
| CN | 108511693 A | 9/2018 |

(Continued)

OTHER PUBLICATIONS

Invitation to pay additional fees issued in App. No. PCT/US2022/053247, mailing date May 12, 2023, 38 pages.

(Continued)

*Primary Examiner* — Thu Khanh T. Nguyen
(74) *Attorney, Agent, or Firm* — Butzel Long

(57) ABSTRACT

Producing an electrode by providing a solvent-free powder that includes an electrode active material and a binder, determining a temperature to be produced at a location of application of a laser beam, selecting a scan frequency at which to control oscillation of the laser beam, producing the electrode by feeding, via a powder feeder, the solvent-free powder onto a current collector and concurrently applying the laser beam to the solvent-free powder to melt the binder of the solvent-free powder at the temperature to produce a coating on the current collector.

40 Claims, 12 Drawing Sheets

(56) References Cited

U.S. PATENT DOCUMENTS

| | | | |
|---|---|---|---|
| 8,771,872 | B2 | 7/2014 | Takada |
| 9,159,496 | B2 | 10/2015 | Uehara |
| 9,614,215 | B2 | 4/2017 | Izuhara |
| 10,658,672 | B2 | 5/2020 | Mori |
| 10,763,514 | B2 | 9/2020 | Pfleging |
| 2016/0133917 | A1 | 5/2016 | Choi |
| 2017/0346129 | A1* | 11/2017 | Stolyarov ........... H01M 4/5825 |
| 2019/0009369 | A1* | 1/2019 | Vorontsov .............. B33Y 50/02 |
| 2019/0217387 | A1* | 7/2019 | Pan ....................... B29C 64/205 |
| 2020/0212498 | A1 | 7/2020 | Kitamura |
| 2020/0411838 | A1 | 12/2020 | Schoenung |
| 2021/0069786 | A1 | 3/2021 | Hall |

FOREIGN PATENT DOCUMENTS

| | | |
|---|---|---|
| EP | 2953184 | 12/2015 |
| KR | 20150051648 A | 5/2015 |
| KR | 20190015134 | 2/2019 |
| WO | 2016072664 | 5/2016 |
| WO | 2018134486 | 7/2018 |
| WO | 2021170910 | 9/2021 |

OTHER PUBLICATIONS

International Search Report and Written Opinion issued in App. No. PCT/US2022/053247, mailing date Jul. 3, 2023, 22 pages.
International Preliminary Report on Patentability issued in App. No. PCT/US2022/053247, mailing date Jul. 4, 2024, 14 pages.
Sun S. et al., "Comparison between continuous wave and pulsed Nd:YAG laser cladding of stellite 6", Proceedings of the 23rd International Congress on Applications of Lasers and Electro-Optics, 2004, XP093043811, USA, DOI: 102351/1.5060303, ISBN: 978-0-912035-77-2.

* cited by examiner

MANUFACTURING BATTERY ELECTRODES

TECHNICAL FIELD

The disclosure relates generally to manufacturing electrodes and more specifically, to methods and systems for manufacturing battery electrodes using laser beams.

BACKGROUND

Batteries usually have two electrodes comprising a cathode and an anode. The cathode may include a cathode current collector and a cathode active material, and the anode may include includes an anode active material and an anode current collector. Conventionally, the electrodes may be manufactured in a slurry casting method wherein, for example, a cathode electrode slurry mixture is obtained by mixing an active material, a binder, a solvent and a conductive additive together. The solvent may dissolve the binder which binds the mixture together. The slurry may then be coated onto a material, dried and compacted and the resulting electrode is cut and vacuum dried to produce a finished electrode. Every cycle to produce a finished coating may take, typically, between 16 hours to 40 hours, for completion. In addition, solvent toxicity, reactivity between electrode material and solvent, and physiochemical changes are characteristics that may have to be considered in slurry casting methods.

BRIEF SUMMARY

The illustrative embodiments are directed to manufacturing battery electrodes using laser beams. In one aspect, a method disclosed. The method includes providing a solvent-free powder that includes at least an electrode active material and a binder, determining a desired temperature to be produced at a location of application of a laser beam, selecting a scan frequency at which to control oscillation of the laser beam, and producing the electrode by feeding, via a powder feeder, the solvent-free powder onto a current collector and concurrently applying the laser beam to the solvent-free powder to melt the binder of the solvent-free powder at said desired temperature to produce a coating on the current collector.

The method may also include feeding the solvent-free powder in an off-axis powder feeding manner or in a coaxial powder feeding manner. The method may also include determining a desired thickness of the coating and the desired temperature produced at a location of application of the laser beam to melt the binder such that the coating. The desired thickness may be based on a feed rate of the solvent-free powder and on a coating speed of the solvent-free powder. The desired temperature may be based on a power or more specifically a power density of the laser beam (a ratio of laser power to the cross-section area), a scan width of the laser, the selected scan frequency of the laser, and a coating speed of the solvent-free powder.

In another aspect, an apparatus is disclosed. The apparatus may include a laser system that has a laser welding head configured to provide a laser beam, and a laser beam positioning device that may be part of or form the laser welding head, said laser beam positioning device being configured to control the laser beam to oscillate at a selected scan frequency. The apparatus may also include a powder feeder configured to feed a solvent-free powder through a nozzle onto a current collector disposed on a base. The powder feeder feeds the solvent-free powder on the current collector, concurrently to oscillation of the laser beam such that application of the laser beam to the solvent-free powder at a desired temperature melts the binder of the solvent-free powder to produce a coating on the current collector.

In yet another aspect, a computer system is disclosed. The computer system may include a processor and a memory storing instructions that, when executed by the processor, configure the system to determine a desired temperature produced at a location of application of the laser beam, control a laser beam to oscillate at a selected scan frequency, and produce an electrode by feeding, via a powder feeder, a solvent-free powder onto a current collector and concurrently applying the laser beam to the solvent-free powder to melt the binder of the solvent-free powder at the desired temperature to produce a coating on the current collector.

In a further aspect, a non-transitory computer-readable storage medium is disclosed. The non-transitory computer-readable storage medium stores instructions that when executed by a computer, cause the computer to determine a desired temperature produced at a location of application of the laser beam, control a laser beam to oscillate at a selected scan frequency, and produce an electrode by feeding, via a powder feeder, a solvent-free powder onto a current collector and concurrently applying the laser beam to the solvent-free powder to melt the binder of the solvent-free powder at said desired temperature to produce a coating on the current collector.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
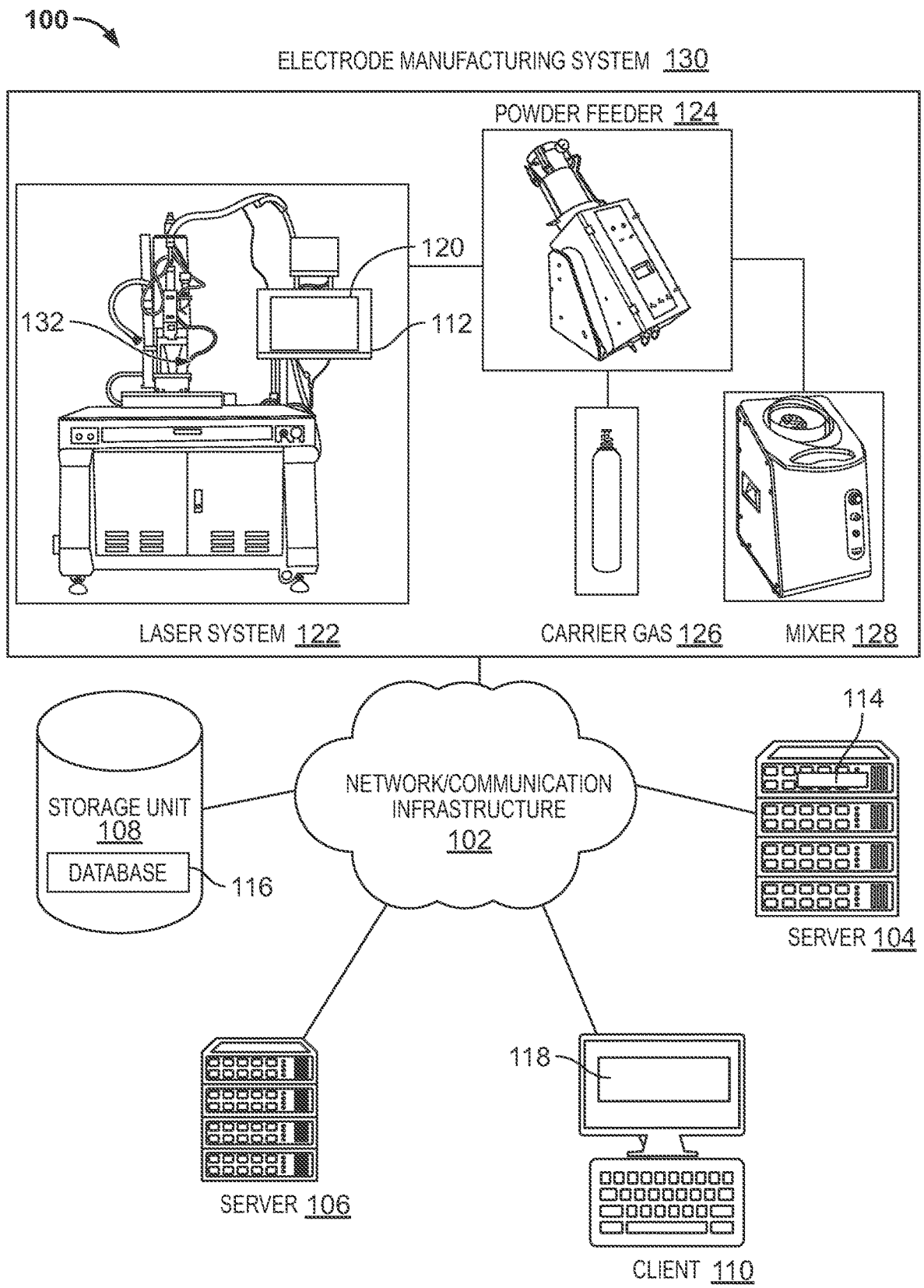
FIG. 1 depicts a block diagram of a manufacturing environment including a network of data processing systems in which illustrative embodiments may be implemented.

The illustrative embodiments are directed to manufacturing battery electrodes by coating current collector materials in a laser coating process using continuous wave emission laser. In a continuous-wave (cw) operation, the laser source may be continuously operated, i.e., not pulsed. Further, a power of the laser beam applied may remain constant with time. By controlling the parameters of the laser beam such as laser power, beam spot size, oscillating scan width and scan frequency, the current collector materials may be coated with solvent-free electrode materials at a desired temperature to achieve a desired coating thickness. For example, increasing a coating thickness may increase an associated battery energy capacity. Thus, the process may involve the adoption of scanning optics configured to oscillate the laser beam in a given base area such as a current collector containing a layer of the solvent-free electrode materials to coat to coat the base area with the solvent-free electrode material. In aspect herein, the solvent-free electrode materials may include at least a mixture of active electrode materials and a binder.

The illustrative embodiments recognize that a time for said laser coating cycle on a current collector may be, for example, be 5-20 sec±2 for a length about 100 mm.

In the laser coating process, a stream of solvent-free powder may be fed onto a current collector and a laser beam scans across a target surface containing the solvent-free powder, creating a coating on the current collector. Materials may be fed in a controlled manner, and with enough heat to melt a binder of the solvent-free powder without affecting or significantly affecting the underlying current collector substrate. This creates the mechanically bonded coating which serves as the active material of the resulting electrode. Use of the binder in the solvent-free powder may thus enable the holding of the coating particles together, it may assist in adhering the coating to the current collector and it may remain stable inside the harsh environment of the battery. Feeding of the solvent-free powder may be done concurrently to application of the laser. For example, the laser beam may be applied to a slice of solvent-free powder fast enough that the laser beam hits the powder as soon as said powder hits the current collector to prevent the powder from bouncing off of the current collector. In practice there may be may delay in a time between when a slice or amount of the solvent-free powder hits the current collector and when the laser is applied to said slice or amount. By choosing an appropriate combination of scanning parameters such as scan frequency, scan width, coating speed and powder feed rate, the time delay may be configured to be as small as possible. A Programmable Logic Controller (PLC)/CNC may be used to synchronize application of the laser beam via a laser system and feeding of the solvent-free powder via the powder feeder, by operating a laser beam positioning device such as a galvo-mirror and a controller of the powder feeder to minimize said time delay.

Certain manufacturing operations are described as occurring at a certain component or location in an embodiment. Such locality of operations is not intended to be limiting on the illustrative embodiments. Any operation described herein as occurring at or performed by a particular component, e.g., laser beam control, can be implemented in such a manner that one component-specific function causes an operation to occur or be performed at another component, e.g., at a local or remote electrode manufacturing system.

An embodiment provides a solvent-free powder comprising at least an electrode active material and a binder. The embodiments control a laser beam to oscillate at a selected scan frequency and determines a desired temperature to be produced at a location of application of the laser beam that may be proportional to a melting temperature of the binder. The embodiment produces an electrode by feeding, via a powder feeder, the solvent-free powder onto a current collector and concurrently applying the laser beam to the solvent-free powder to melt the binder of the solvent-free powder at the desired temperature to produce a coating on the current collector.

The solvent-free powder may be selected to produce a coating on a cathode current collector or on an anode current collector. For example, for a cathode current collector, the solvent-free powder may comprise an active material, a binder and a conductive additive. The active cathode material in an embodiment, may be Lithium Iron Phosphate (LFP-LiFePO4) or Lithium Manganese Oxide (LMO-LiMn2O4), though this is not meant to be limiting. The active cathode material may emit lithium-ions to an anode during charging of a corresponding battery through an electrolyte and separator. The active material may also receive lithium ions during discharging. The binder may comprise, Polyvinylidene Fluoride (PVDF) or Polyvinyl alcohol (PVA), for example. Other materials such as Polyacrylic acid (PAA), Polytetrafluoroethylene (PTFE), Polyurethane (PU), and Styrene-butadiene (SBR) may be used. The binder may hold the coating particles together and assist in adhering said coating to the current collector material. The conductive additive may be selected to speed up ion and electron transport and improve chemical and thermal stability. Example conductive additives may include elements such as Li, Fe, Nb, Mo, Co, V, Mn, Ni, Zn, Cu, Mg and Cr, or nano black carbon.

For an anode current collector, the solvent-free powder may comprise an active material, and a binder. The active material may comprise graphite and the binder may comprise PVDF, for example.

Another embodiment provides an electrode manufacturing system comprising a laser system, and a powder feeder. The laser system may comprise a laser welding head configured to provide the laser beam, and a laser beam positioning device configured to control the laser beam to oscillate at a selected scan frequency. The powder feeder may be configured to feed the solvent-free powder through a nozzle concurrently to the oscillation onto the current collector disposed on a base. By configuring a laser spot size to be small, the electrode manufacturing system may possess a heat affected zone (HAZ) that is minimized and controllable compared to that of plasma systems.

The illustrative embodiments are described with respect to certain types of data, functions, equations, configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
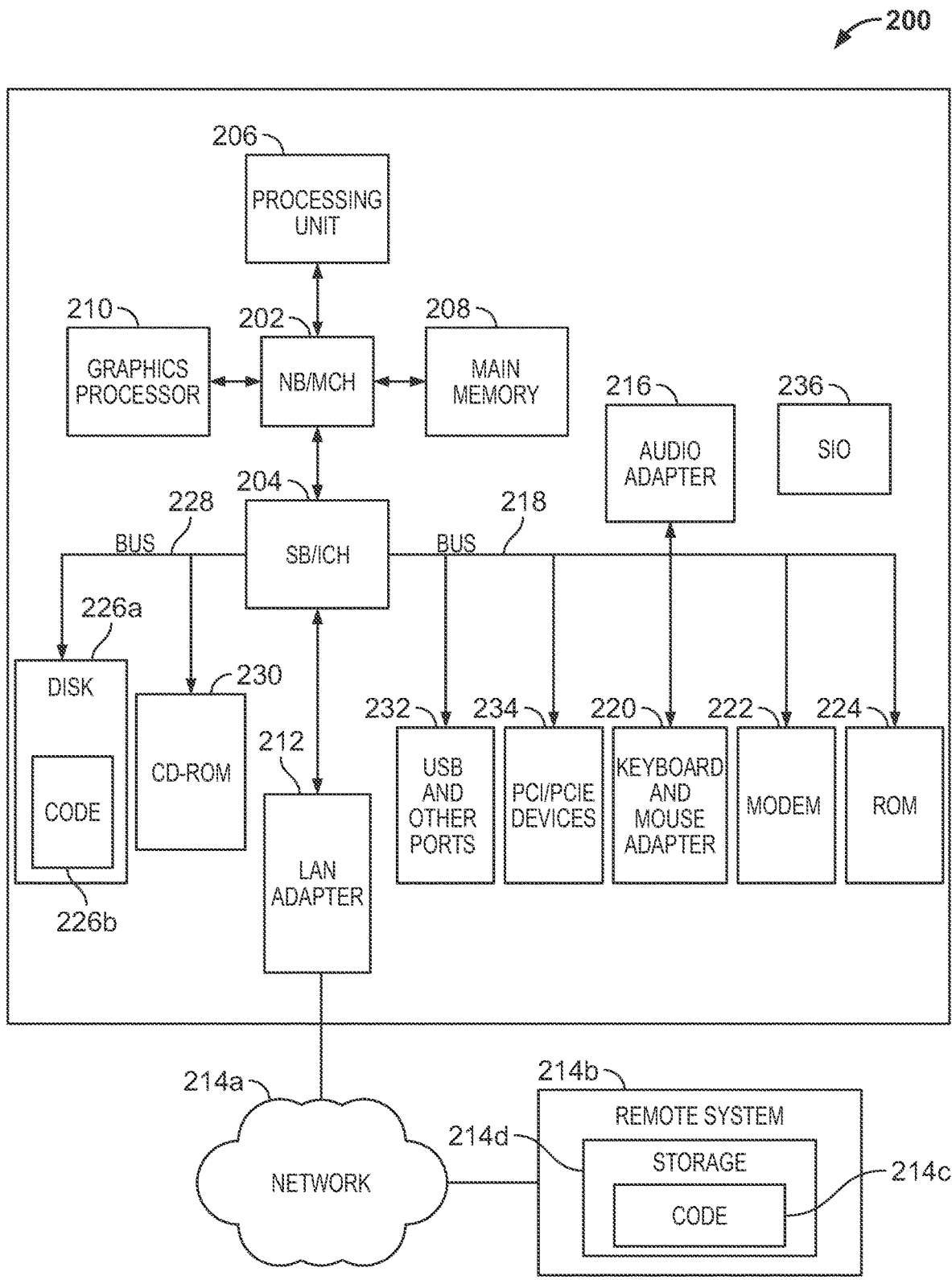
FIG. 2 depicts a block diagram of a data processing system in which illustrative embodiments may be implemented.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of an electrode manufacturing environment 100 in which illustrative embodiments may be implemented. Electrode manufacturing environment 100 includes network/communication infrastructure 102. Network/communication infrastructure 102 is the medium used to provide communications links between various devices, databases and computers connected together within electrode manufacturing environment 100. Network/communication infrastructure 102 may include connections, such as wire, wireless communication links, or fiber optic cables. The environment includes an electrode manufacturing system 130 and clients or servers configured to perform one or more methods herein. The electrode manufacturing system 130 includes a laser system 122 which may comprise a laser welding head 132, a dashboard 112 and a dashboard application 120. The dashboard application 120 may be operable to control parameters of the laser beam and/or powder feeder 124 including, for example, oscillation frequency, powder feed rate, coating speed, laser power density, laser beam scan width, and/or temperature produced by application of the laser beam for the coating process. The electrode manufacturing system 130 may also include a powder feeder 124 which feeds, using the carrier gas 126, the solvent-free powder to the current collector. In an embodiment, the carrier gas 126 is Argon. Further, a shielding gas such as Argon may be used in some embodiment to provide an environment free of impurities for laser coating. A mixer 128 may be used to mix the solvent-free powder prior to providing it to the powder feeder 124.

Clients or servers are only example roles of certain data processing systems connected to network/communication infrastructure 102 and are not intended to exclude other configurations or roles for these data processing systems or to imply a limitation to a client-server architecture. Server 104 and server 106 couple to network/communication infrastructure 102 along with storage unit 108. Software applications may execute on any computer in electrode manufacturing environment 100. Client 110, dashboard 112 are also coupled to network/communication infrastructure 102. Client 110 may be a remote computer with a display. A data processing system, such as server 104 or server 106, or clients (client 110, dashboard 112) may contain data and may have software applications or software tools executing thereon.

As another example, an embodiment can be distributed across several data processing systems and a data network as shown, whereas another embodiment can be implemented on a single data processing system within the scope of the illustrative embodiments. Data processing systems (server 104, server 106, client 110, dashboard 112) also represent example nodes in a cluster, partitions, and other configurations suitable for implementing an embodiment.

Client application 118, dashboard application 120, or any other application such as server application 114 implements an embodiment described herein. Any of the applications can use data from electrode manufacturing system 130 and to perform one or more processes described herein. The applications can also obtain data from storage unit 108 for manufacturing purposes. The applications can also execute in any of data processing systems (server 104 or server 106, client 110, dashboard 112).

Server 104, server 106, storage unit 108, client 110, dashboard 112, may couple to network/communication infrastructure 102 using wired connections, wireless communication protocols, or other suitable data connectivity. Client 110, and dashboard 112 may be, for example, mobile phones, personal computers or network computers.

In the depicted example, server 104 may provide data, such as boot files, operating system images, and applications to client 110, and dashboard 112. Client 110, and dashboard 112 may be clients to server 104 in this example. Client 110, and dashboard 112 or some combination thereof, may include their own data, boot files, operating system images, and applications. Electrode manufacturing environment 100 may include additional servers, clients, and other devices that are not shown.

Network/communication infrastructure 102 may represent a collection of networks and gateways that use the Transmission Control Protocol/Internet Protocol (TCP/IP) and other protocols to communicate with one another. Of course, electrode manufacturing environment 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, this figure depicts a block diagram of a data processing system in which illustrative embodiments may be implemented. Data processing system 200 is an example of a computer, such as client 110, dashboard 112, server 104, or server 106, in FIG. 1, or another type of device in which computer usable program code or instructions implementing the processes may be located for the illustrative embodiments.

Data processing system 200 is described as a computer only as an example, without being limited thereto. Implementations in the form of other devices, in FIG. 3, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices.

Instructions for the operating system, the object-oriented programming system, and applications or programs, (such as dashboard application 120, or application 114) are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. In addition, the processes of the illustrative embodiments may be applied to a multiprocessor data processing system.

A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile device.

Figure 3:
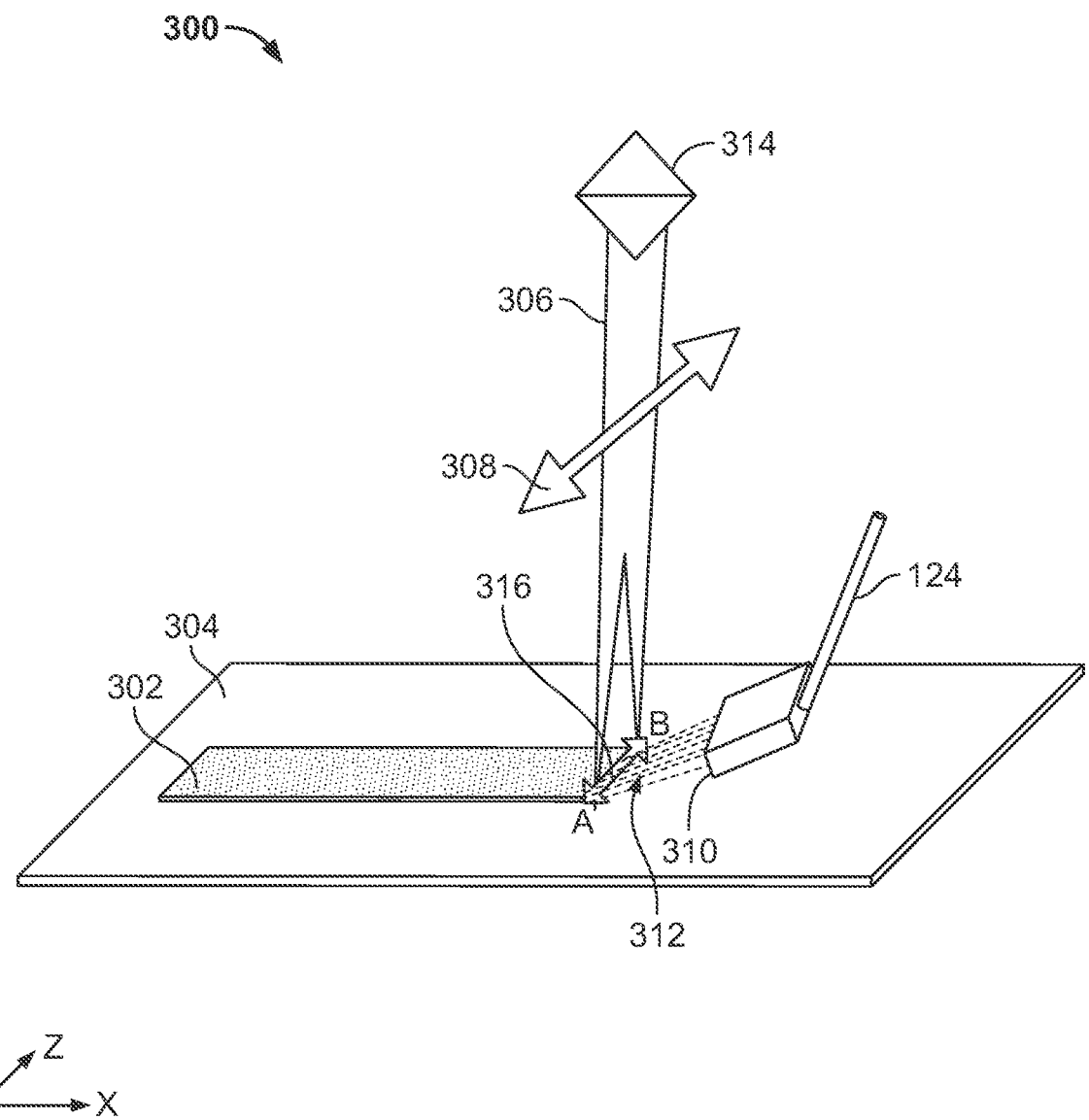
FIG. 3 depicts a perspective view of an off-axis powder feeding electrode manufacturing system in which some illustrative embodiments may be implemented.

Turning now to FIG. 3, an exemplary electrode manufacturing system will be described. The electrode manufacturing system is an off-axis powder feeding electrode manufacturing system 300 comprising a powder feeder 124, a laser beam 306, and a laser beam positioning device 314 disposed in a laser welding head 132. The powder feeder 124 may have a nozzle 310, which may be a flat nozzle, that ejects, aided by a carrier gas 126, the solvent-free powder 312 on the current collector 304 to create the coating 302. The flat shape of the nozzle in FIG. 3 may aid in providing consecutive allocations of solvent-free powder covering point A to point B for consecutive coating in the X-direction of FIG. 3. In the off-axis powder feeding electrode manufacturing system 300 the powder feeder 124 feeds the solvent-free powder 312 in an off-axis powder feeding manner by applying the solvent-free powder 312 to the current collector in a direction perpendicularly or substantially perpendicularly to a profile of the laser beam, i.e., applying the powder perpendicularly or substantially perpendicularly to the Y-axis.

The laser beam positioning device 314 may be any device configured to oscillate 308 the laser beam 306 at a pre-defined/selected scan frequency about a defined target area 316 that corresponds to a desired width of the coating 302. The target area 316 may be a slice that corresponds to one pass of the laser beam from point A to point B. After a first pass, the laser beam 306 or current collector 304 may be displaced, in the X-direction, by a distance corresponding to another slice and a second or subsequent pass of the laser beam 306 is carried out to build the coating 302 in said X-direction. The displacing may be carried out at a coating speed that may be selected to ensure particles of the solvent-free powder 312 are not missed by the laser beam 306. In an embodiment, the laser beam positioning device 314 is a galvo-mirror (mirror galvanometer) or scanning optics which is configured to deflect, using, for example, one or more mirrors, the laser beam 306 responsive to sensing an electric current.

In one aspect, the powder feeder 124 feeds the solvent-free powder 312 onto the current collector 304, concurrently to an oscillation process of the laser beam 306 such that application of the laser beam to the solvent-free powder 312 at a defined temperature melts the binder of the solvent-free powder to produce the coating 302 on the current collector 304. The application of the laser beam and feeding of the solvent-free powder may be done at the same time, though in practice there may be a small time delay. Minimizing this time delay ensures that the solvent free powder is melted as soon as it lands on the current collector. The off-axis powder feeding electrode manufacturing system 300 and more generally, the electrode manufacturing system 130 may include a laser system 122 having the laser welding head 132 wherein the laser system 122 further comprises a fiber laser with wavelength of about 1070 nm (e.g., 1060-1080 nm); and the laser welding head 132 is configured to oscillate the laser beam at various frequencies and scan widths. In an illustrative embodiment, the laser welding head 132 has a spot diameter of about 100 microns. Further, defocusing of the laser beam may be performed to achieve a bigger spot diameter when necessary. The laser device may not be limited to fiber lasers as other laser devices including a disk laser, a diode laser and a $CO_2$ laser may be used.

Figure 4:
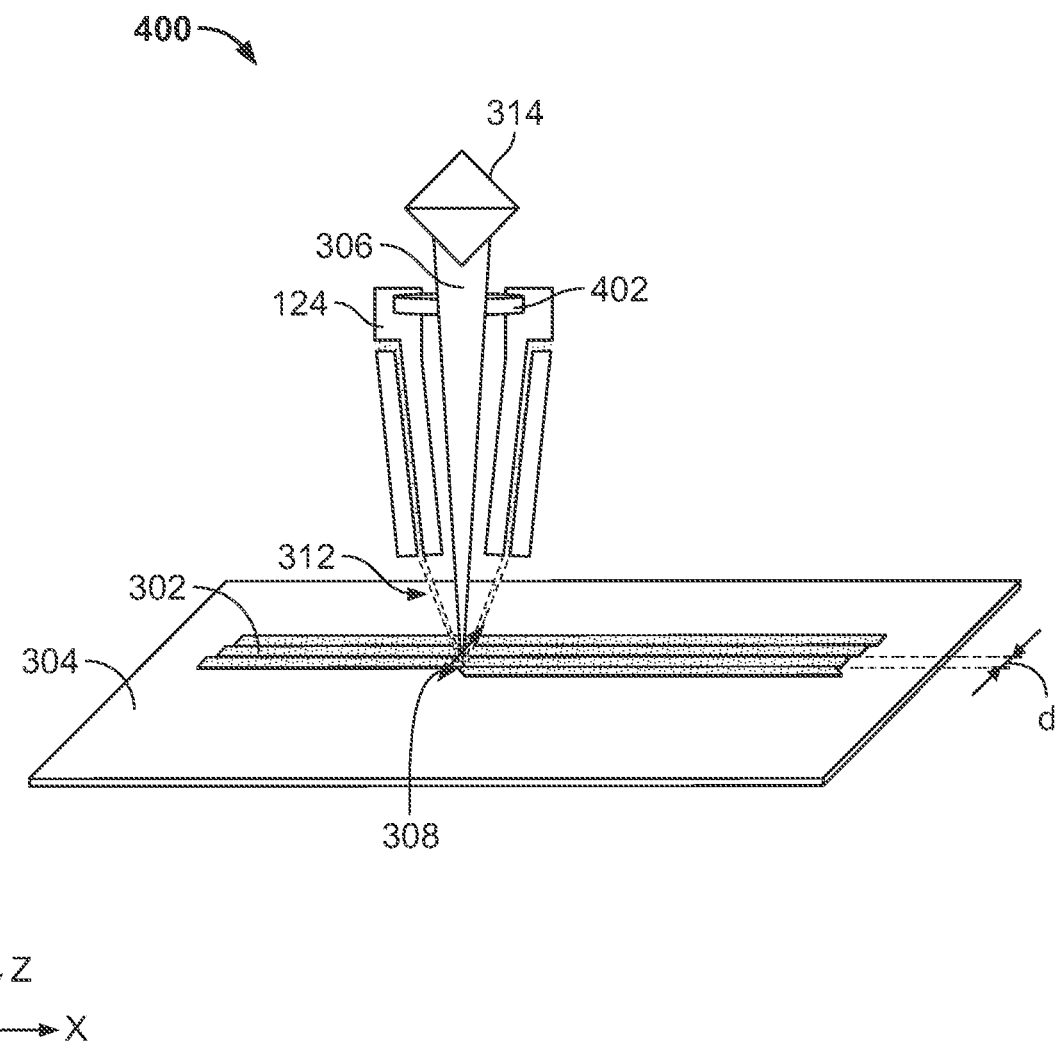
FIG. 4 depicts a perspective view of a coaxial powder feeding electrode manufacturing system in which some illustrative embodiments may be implemented.

FIG. 4 shows an embodiment depicting a coaxial powder feeding electrode manufacturing system 400 wherein the powder feeder 124 feeds the solvent-free powder 312 in a coaxial powder feeding manner by applying the solvent-free powder coaxially or substantially coaxially to a profile of the laser beam, i.e., in the Y-axis.

The coaxial powder feeding electrode manufacturing system 400 may comprise a powder feeder 124, a laser beam 306, a laser beam positioning device 314 and a focus lens 402, the focus lens 402 being configured to focus the laser beam onto a target area of the current collector 304 while concurrently feeding the solvent-free powder 312 to said target area. Similarly to the off-axis powder feeding electrode manufacturing system 300, the coaxial powder feeding electrode manufacturing system 400 may be configured to oscillate 308 in the Z-axis of FIG. 4. However, said oscillation may to confined to distance "d" which may be equal to or approximately equal to or proportional to the diameter or width of an amount of the solvent-free powder ejected by the coaxial feeder while the laser beam head is translated in the X-direction to increase a width of the coating 302 in the Z-direction. Said oscillation may allow the whole surface of an ejected amount of solvent-free powder to receive the laser beam as opposed a fraction of the solvent free powder receiving the laser beam. Further, the focus lens 402 may be used to focus or defocus the laser beam to control beam spot size. By so doing, a laser beam with a relatively large spot size may be altered to have a smaller spot size that corresponds to the area covered by the newly ejected solvent-free powder, and vice versa. A laser welding head 132 producing the laser beam 306 may be controlled to scan the current collector in the X-direction at a selected speed to produce the coating 302. Of course, the particular configurations of FIG. 3 and FIG. 4 are not meant to be limiting as modifications, other configurations and technical features may be readily apparent to one skilled in the art from the descriptions.

Figure 5:
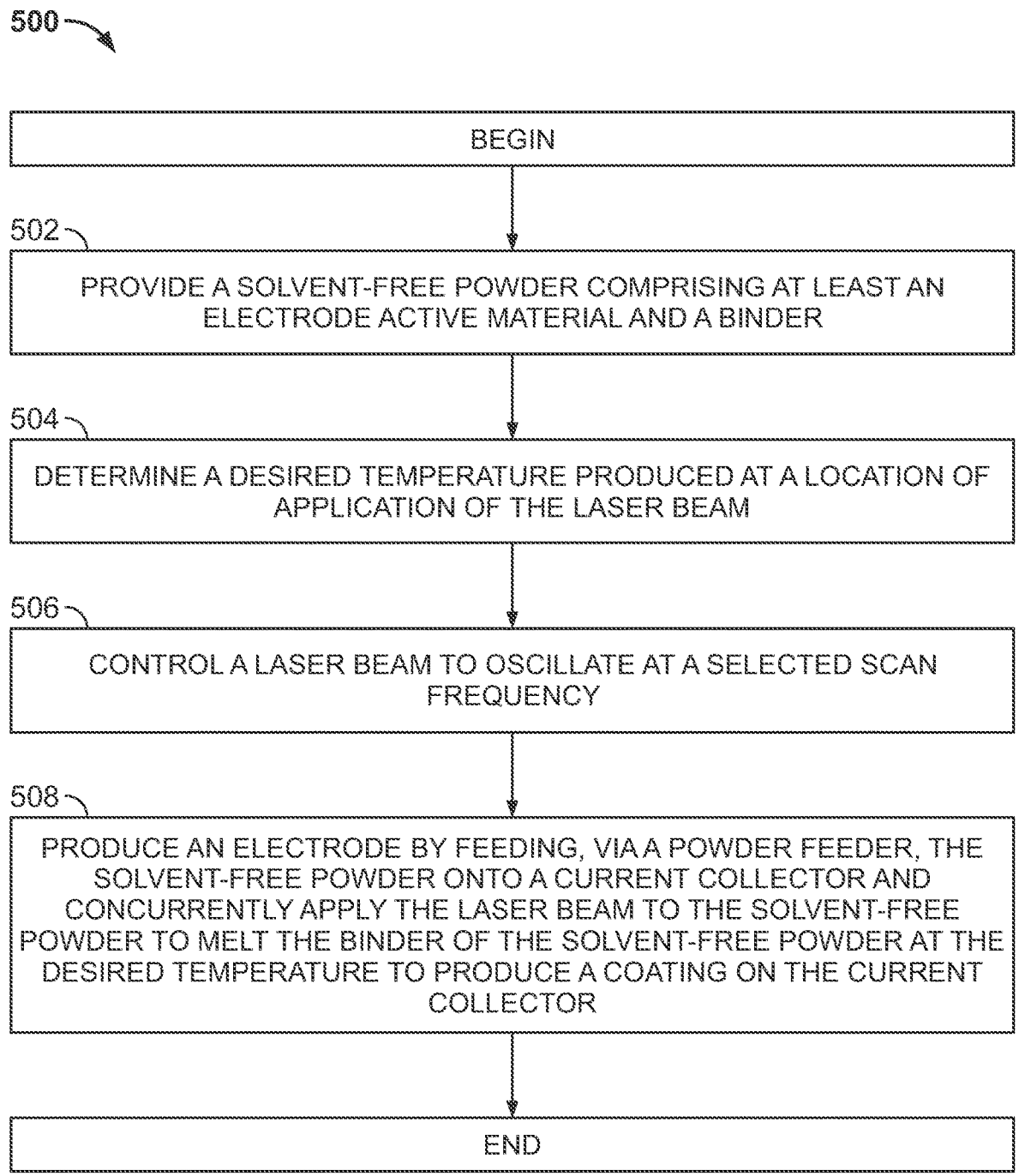
FIG. 5 depicts a process in accordance with illustrative embodiments.

FIG. 5 illustrates a process 500 in which electrodes may be manufactured. The process 500 begins at step 502, wherein a solvent-free powder comprising at least an electrode active material and a binder are provided. In step 504, process 500 determines a desired temperature to be produced at a location of application of the laser beam. In step 506, process 500 controls the laser beam to oscillate at a selected scan frequency. In step 508, the electrode is produced wherein process 500 feeds, via a powder feeder, the solvent-free powder onto a current collector and concurrently applies the laser beam to the solvent-free powder to melt the binder of the solvent-free powder at the desired temperature to produce a coating on the current collector. Prior to process 500, the current collector may be prepared by pre-heating it using the same or different laser beam to aid in the coating process. Further the solvent-free powder may also be pre-heated prior to feeding it through the nozzle 310. Pre-heating may aid in bonding the powder to the current collector.

The current collector 304 may be a cathode current collector or an anode current collector. The cathode current collector may be, for example, an aluminum foil (or other materials such as Cu, Ni, Ti, Au, stainless steel and carbonaceous materials) and the active cathode material may be, for example, Lithium Iron Phosphate (LFP) or Lithium Manganese Oxide (LMO). The active cathode material may be mixed with a binder and a conductive additive to form the solvent-free powder 312. The anode current collector may be, for example, copper (or other materials such as Ni, or Au) and the active anode material may be, for example, graphite. The active anode material may be mixed with a binder to form the solvent-free powder 312. Further, since there is no use of a plasma plume to vaporize materials for deposition onto an opposite facing substrate there may be no need for a vacuum or oxygen-filled environment in embodiments described herein.

In one or more aspects herein, the desired temperature is selected to melt the binder material. For example, a melting temperature for PVDF is 90-150° C. whereas a melting temperature for graphite is +3500° C. Thus, by selecting the desired temperature to be, for example 90-150° C. or slightly higher, the PVDF binder may be melted to bind the graphite to the anode current collector.

One or more aspects herein further compute, for the electrode manufacturing system 130 and more specifically for both the off-axis powder feeding electrode manufacturing system 300 and the coaxial powder feeding electrode manufacturing system 400, a desired thickness of the coating and the desired temperature produced at a location of application of the laser beam to melt the binder such that the coating has possesses a desired shape. The desired thickness may be is based on a feed rate of the solvent-free powder and on a coating speed of the solvent-free powder. Further, the desired temperature may be based on a power or more specifically, power density of the laser beam, a scan width of the laser, the defined scan frequency of the laser, and the coating speed of the solvent-free powder.

More specifically, the desired thickness, measured by a mass feed rate may be proportional to, and almost equal to, a ratio of a powder feed rate to a coating speed and may be determined as follows:

$$\text{Mass feed rate}\left(\frac{\text{g}}{\text{mm}}\right) \approx \frac{\text{Powder feed rate}\left(\frac{\text{g}}{\text{min}}\right)}{\text{Coating speed}\left(\frac{\text{mm}}{\text{min}}\right)}$$

wherein "Powder feed rate" may refer to a rate at which a mass of the solvent-free powder 312 is fed onto the current collector 304 and "Coating speed" may refer to a speed at which the layers or slices of solvent-free powder 312 are coated on the current collector 304 in the X-direction (as shown in FIG. 3).

Further, the desired temperature transfer over time to a current collector, measured by a specific energy input transfer over time from laser beam may be proportional to, and almost equal to, a ratio of a laser power to "scan width× coating speed×laser scan frequency" and determined as follows:

$$\text{Specific energy input transfer}\left(\frac{\text{J}}{\text{mm}^2}\right)(\text{sec}) \approx$$

$$\frac{\text{Laser Power }(J/\text{sec})}{\text{Beam scan width (mm)} \times \text{Coating speed}\left(\frac{\text{mm}}{\text{min}}\right) \times \text{laser scan frequancy}\left(\frac{1}{\text{sec}}\right)}$$

wherein "Laser Power" may refer to a power of the laser beam, "Beam scan width" may refer to a distance covered by one pass of the laser beam (e.g. Distance from A to B as shown in FIG. 3), "Coating speed" may refer to a speed at which the layers or slices of solvent-free powder 312 are coated on the current collector 304 in the X-direction (as shown in FIG. 3), and "laser scan frequency" may refer to the predefined/selected scan frequency at which the laser beam 306 oscillates. Of course, by virtue of these relationships, parameters of the electrode manufacturing system may be altered to achieve variations in desired manufacturing results. Further it will be obvious to persons skilled in the art, by virtue of the descriptions herein, that the mass feed rate and specific energy may further be dependent on other parameters such as optical properties and physical properties of the solvent-free powder 312, and nozzle design and these may be considered to more closely approximate desired temperatures and thicknesses.

In one or more embodiments as shown by FIG. 3, the laser beam 306 is configured to oscillate at the selected scan frequency to produce a coating width of up 10 mm in one pass of the laser beam. In this example, the selected scan frequency may range from, for example, 10 Hz to 200 Hz.

Figure 6:
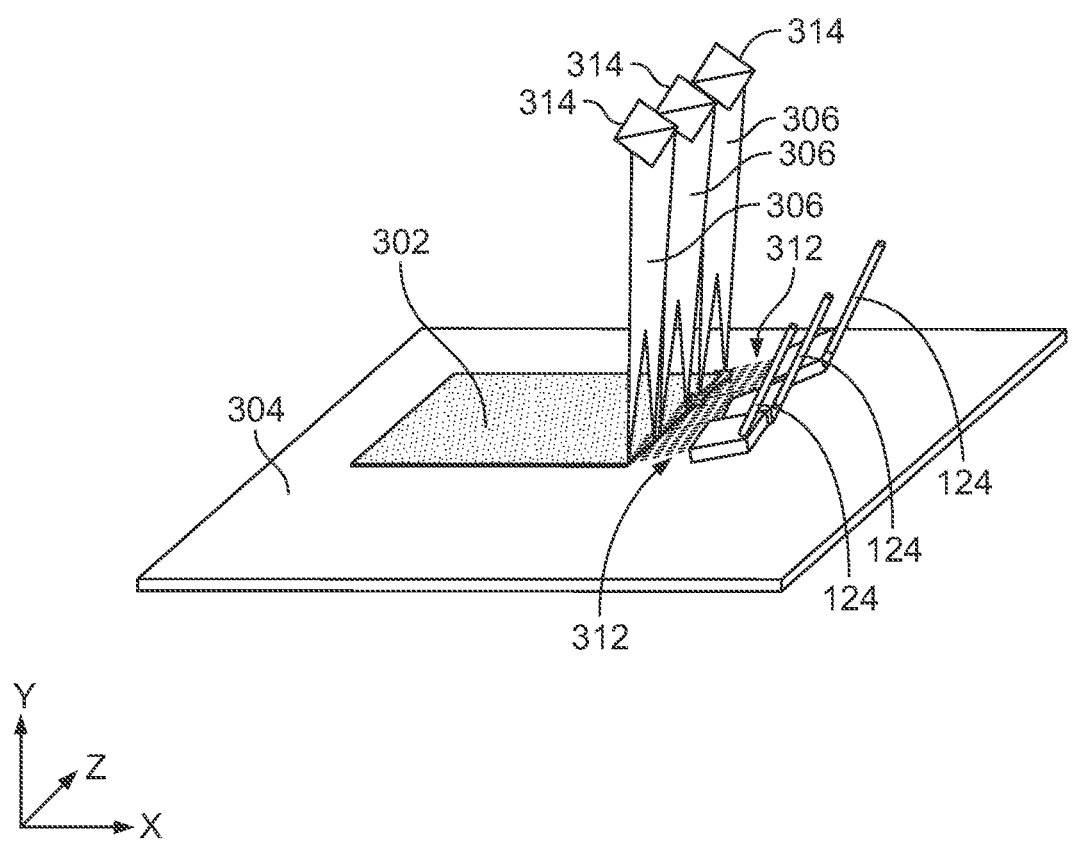
FIG. 6 depicts a perspective view of an electrode manufacturing system having a plurality of laser beams according to some illustrative embodiments.

FIG. 6 depicts an electrode manufacturing system 130, having a plurality of laser beams according to some illustrative embodiments. The system comprises a plurality of adjacent powder feeders 124 that feed a plurality of solvent-free powder 312 to the current collector 304. A plurality of adjacent laser beams 306 are operated by a plurality of laser beam positioning devices 314 to coat the solvent-free powder 312 onto the current collector 304. By this configuration, one or more other laser beams disposed adjacent to a first laser beam are operable with the first laser beam to produce a coating width in, for the off-axis powder feeding electrode manufacturing system 300, that is more than 10 mm in one pass of the first laser beam and one pass of the one or more other laser beams. Said configuration may be equally applicable to the coaxial powder feeding electrode manufacturing system 400 wherein by employing additional distinct laser beams arranged next to each other, a wider coating 302 may be completed faster. Further one or more adjacent laser beams may be configured to preheat a selected area of the current collector prior to coating by the first laser beam.

Figure 7:
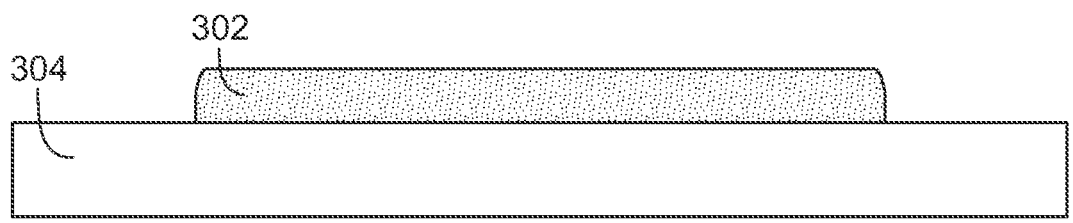
FIG. 7 depicts a cross sectional view of an electrode according to some illustrative embodiments.
Figure 7:
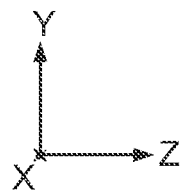

FIG. 7 illustrates a cross sectional view of an electrode produced by the off-axis powder feeding electrode manufacturing system 300. As seen in the view, the coating 302 may have a flat or substantially flat shape in the Z-direction and a flat or substantially flat lengthwise profile in the in the X-direction (into the page of FIG. 7). This may be achieved due to a widening of the distance covered in one pass of the laser beam (up to about 10 mm, from point A to point B of FIG. 3) and a control of the parameters of the laser beam, powder feeder and nozzle design to produce a flat pattern, as described herein, such that an otherwise circular contour characteristic of a laser weld may be eliminated.

Figure 8:
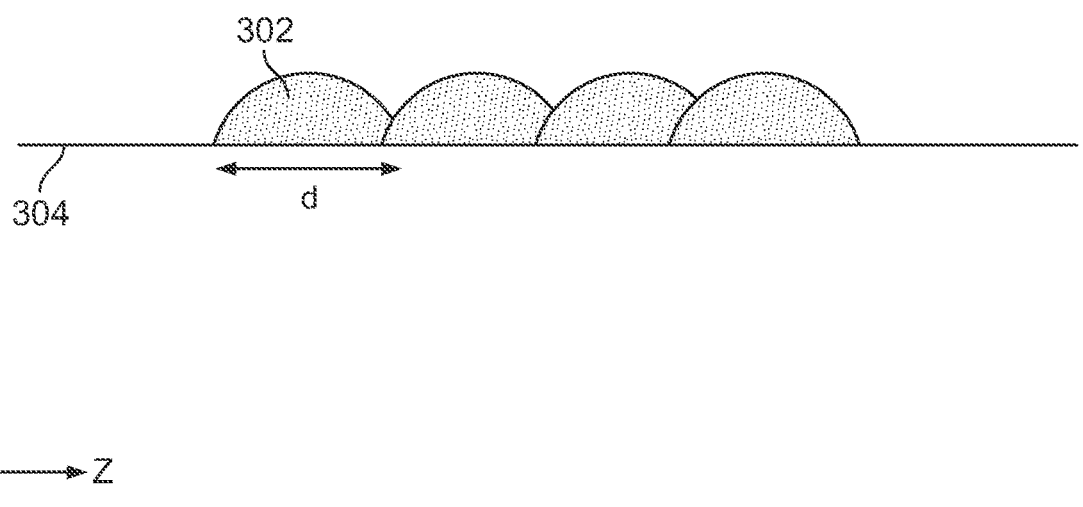
FIG. 8 depicts a cross sectional view of an electrode according to some illustrative embodiments.

FIG. 8 illustrates a cross sectional view of an electrode that may be produced by the coaxial powder feeding electrode manufacturing system 400. As can be seen in the view, coating 302 may in some cases have a repeating circular or substantially circular contour in the Z-direction, said contour extending lengthwise through the X-direction (into the page of FIG. 8).

Figure 9A:
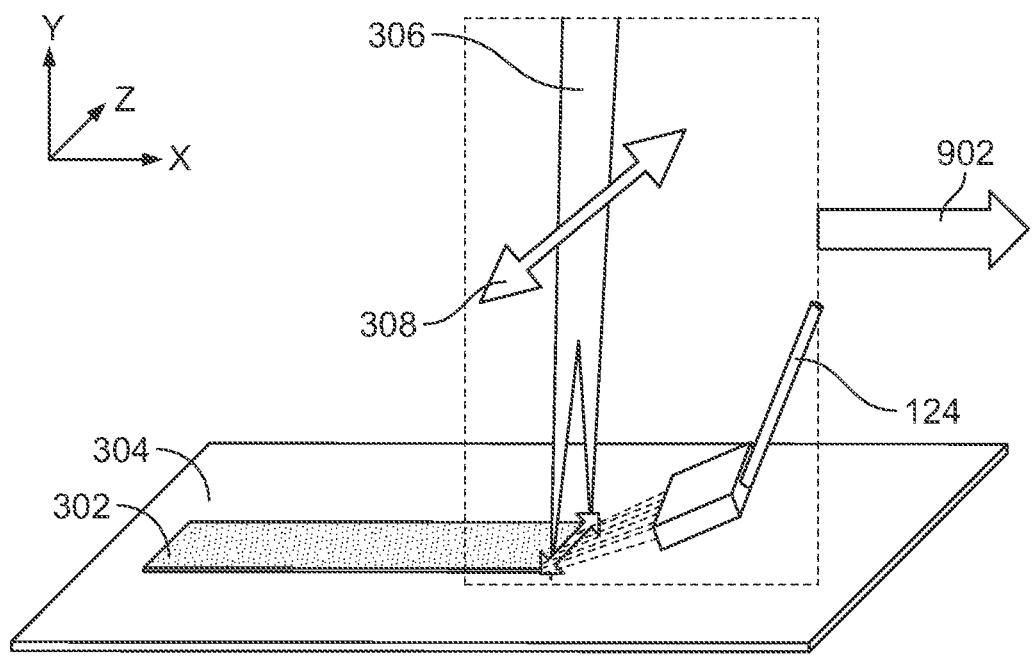
FIG. 9A depicts perspective view of an electrode manufacturing system having a module with components that move in unison in accordance with some illustrative embodiments.

FIG. 9A illustrates an electrode manufacturing system 130 having a moving module 904 with components that move in unison in accordance with some illustrative embodiments. In FIG. 9A, the moving module 904 may comprise the laser beam 306 and powder feeder 124 and the current collector may be disposed on a stationary base (not shown) with the laser beam 306 and powder feeder 124 moving in unison at the coating speed relative to a stationary base, and in the moving direction 902. This may be applicable to both the off-axis powder feeding electrode manufacturing system 300 and the coaxial powder feeding electrode manufacturing system 400.

Figure 9B:
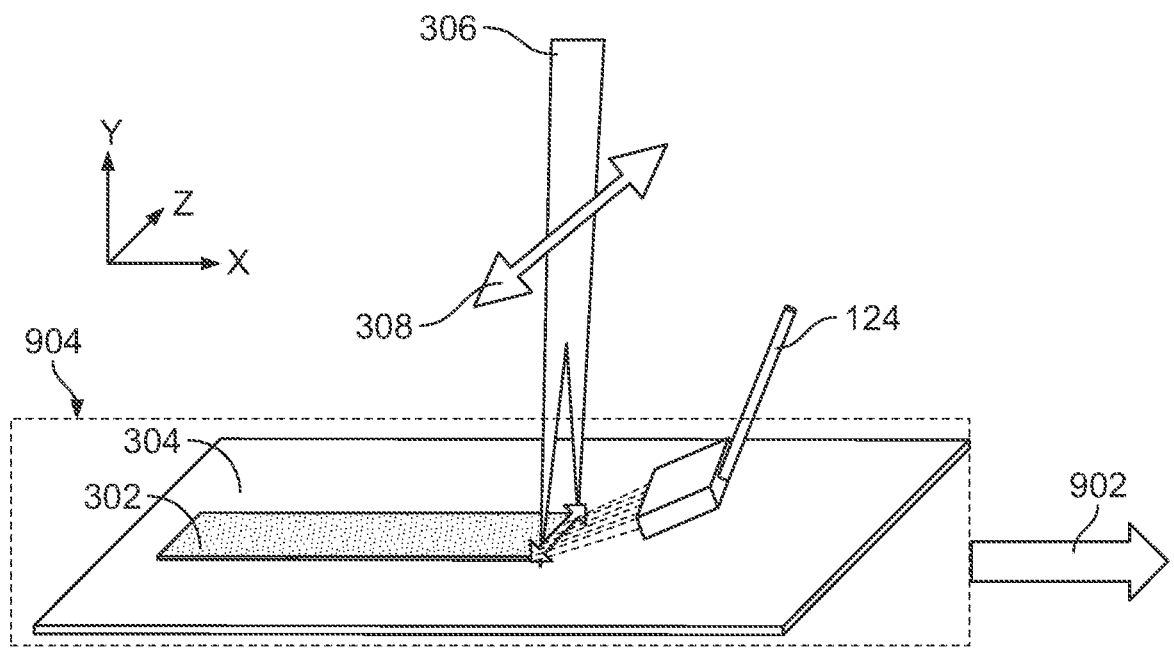
FIG. 9B depicts perspective view of an electrode manufacturing system having another module with components that move in unison in accordance with some illustrative embodiments.

Alternatively, as shown in FIG. 9B, the moving module 904 may comprise the current collector 304 disposed on a moving base (not shown) with the moving module 904 moving at the coating speed in the moving direction 902 while the laser beam and powder feeder are stationary relative to the moving base. This may also be applicable to both the off-axis powder feeding electrode manufacturing system 300 and the coaxial powder feeding electrode manufacturing system 400.

Generally, however, a module comprising the laser beam 306 and powder feeder 124 and another module comprising the current collector 304 and a base, may both move relative to each other such that a relative speed of one module to the other equals the coating speed.

Figure 10B:
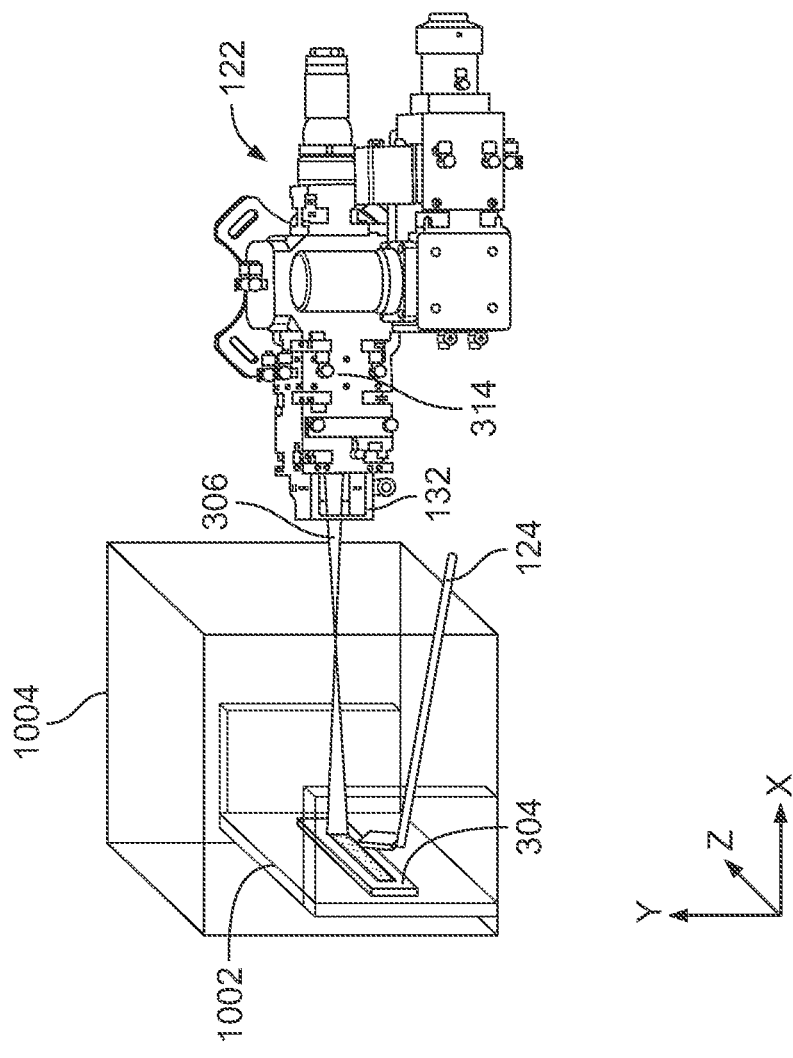
FIG. 10B depicts a perspective view of an electrode manufacturing system having a housing in accordance with some illustrative embodiments.
Figure 10A:
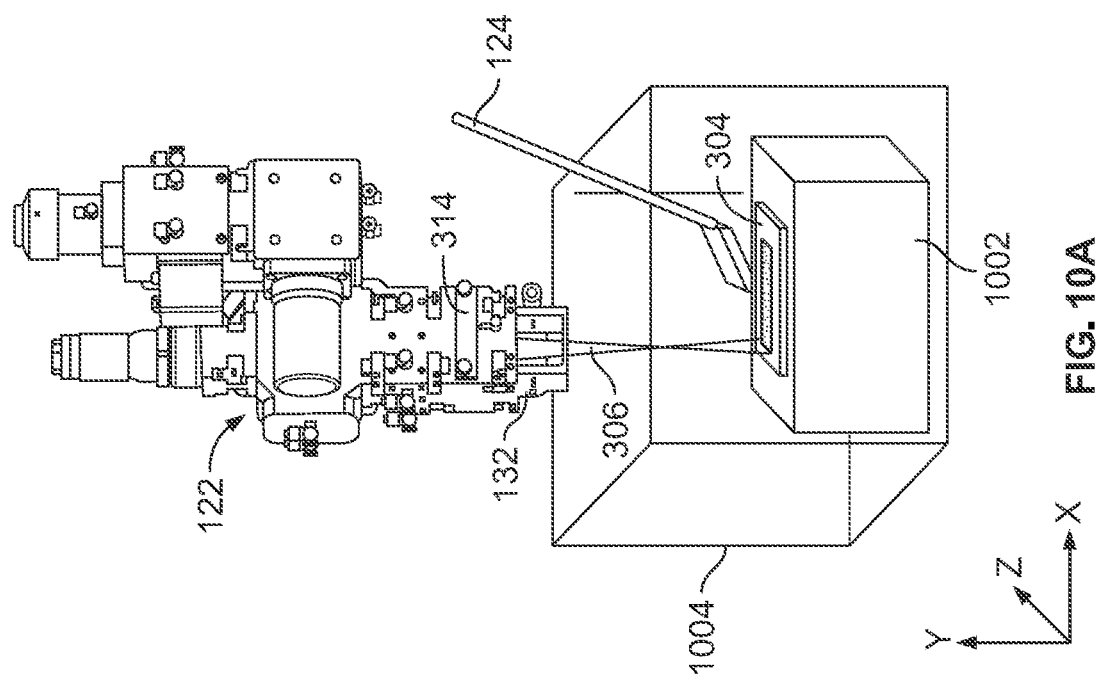
FIG. 10A depicts a perspective view of an electrode manufacturing system having a housing in accordance with some illustrative embodiments.

FIG. 10A and FIG. 10B depict a perspective view of an electrode manufacturing system having a housing 1004 in accordance with some embodiments. The housing 1004 may comprise Polymethyl methacrylate (PMMA) or other transparent, shatter-resistant thermoplastic or glass. Since the solvent-free powder 312 may be fed using a carrier gas, the housing may confine movement of uncoated solvent-free powder 312 into an environment inside side housing. A first configuration, as shown in FIG. 10A may comprise disposing the current collector 304 on the base 1002 such that the current collector 304 lies on its large surface area in the X-Z plane, wherein the X-Z plane parallel to a floor of the manufacturing room. Herein the laser beam 306 may be applied from the Y-direction.

A second configuration, as shown in FIG. 10B may comprise disposing the current collector 304 on the base 1002 such that the current collector 304 lies on its large surface area in the Y-Z plane, with the X-Z plane being parallel to a floor of the manufacturing room. Herein the laser beam 306 may be applied from the X-direction. Of course, these configurations are not meant to be limiting as similar configurations may be obtained by skilled persons in the art by virtue of the descriptions herein.

Figure 11:
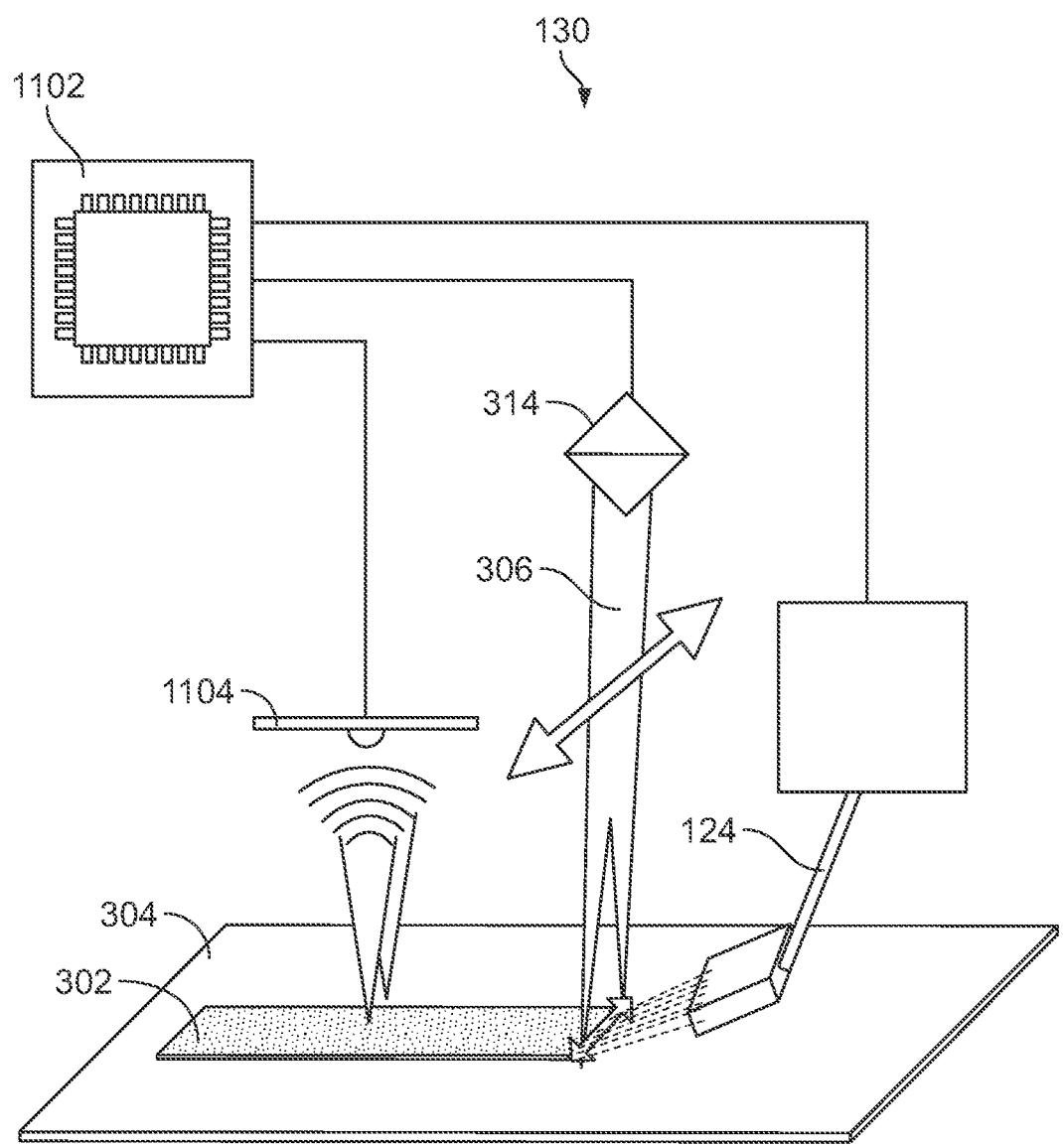
FIG. 11 depicts a perspective view of a system in accordance with some illustrative embodiments.

FIG. 11 shows an electrode manufacturing system 130 such as system 300 or 400 comprising a sensor 1104 such as an optical sensor (e.g. a chromatic confocal sensor), thickness gauge or other sensor or device configured to measure a thickness of the coating 302. The measurement may be used in a closed loop thickness control wherein, responsive to said measured thickness exceeding a defined threshold, one or more parameters of the laser beam and the powder feeder are automatically controlled to maintain the desired thickness such that a thickness of a newly created coating portion is equal to the desired thickness or falls within a defined threshold about the desired thickness.

In an exemplary embodiment, the sensor 1104 is an optical sensor (e.g. a chromatic confocal sensor), that may, for example, measure a distance between the sensor and the coating surface by projecting light to a surface of a portion of the coating as well as to a corresponding surface of the current collector 304. A difference between a distance from the current collector to the light source and the distance from the coating to the light source represents a thickness of the coating 302. A plurality of optical sensors may be used. By measuring a thickness of the coating at a given surface of the coating, for example a thickness of a recently coated slice/amount of solvent-free powder, the laser beam positioning device 314 (frequency and process/coating speed) and powder feeder 124 (powder feed rate) may be controlled by a controller 1102 to increase or decrease the thickness of new slices thereby automatically ensuring that a desired thickness or thickness range of the coating is achieved throughout or substantially throughout the length of the coating. In system 400, this may aid in flattening the circular or substantially circular contour shown in FIG. 8.

Figure 12A:
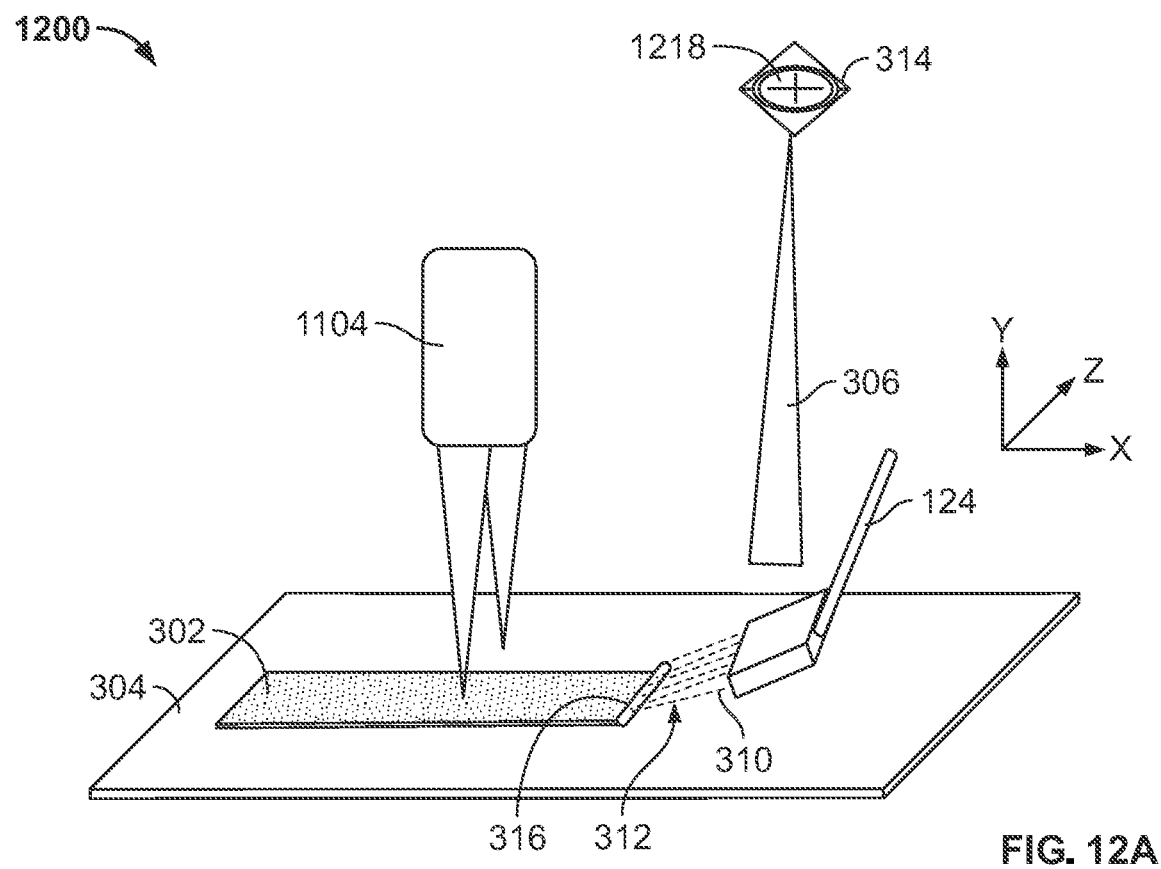
FIG. 12A depicts an perspective view of an off-axis powder feeding electrode manufacturing system in accordance with some illustrative embodiments.
Figure 12B:
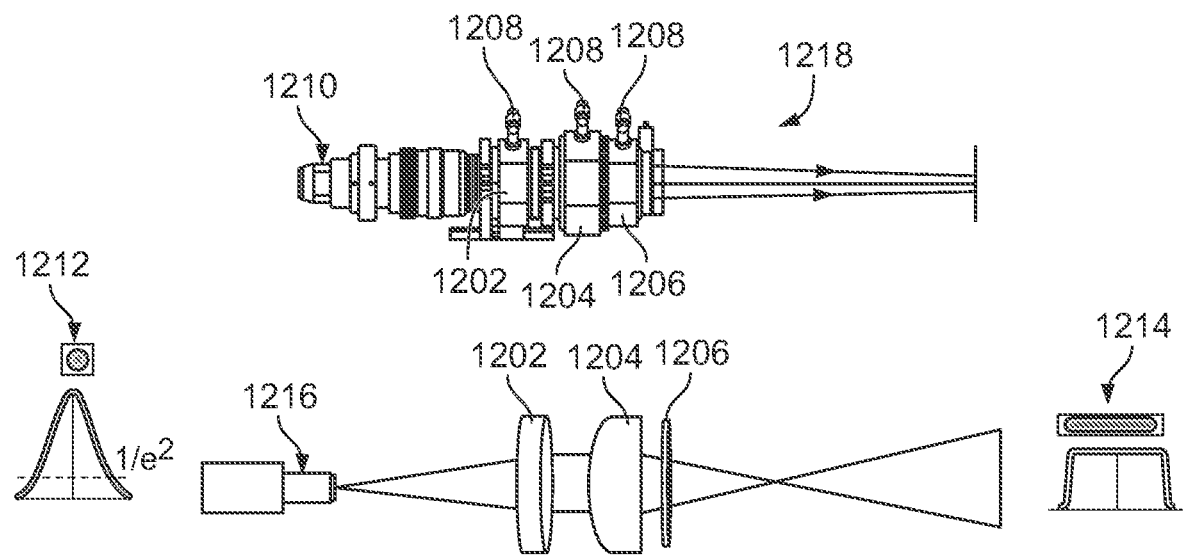
FIG. 12B depicts a laser beam shaping device in accordance with some illustrative embodiments.

Turning now to FIG. 12A, another example of the off-axis powder feeding electrode manufacturing system is shown. Unlike the off-axis powder feeding electrode manufacturing system 300 of FIG. 3 which may produce an oscillating laser beam in the coating/manufacturing process, the off-axis powder feeding electrode manufacturing system 1200 of FIG. 12A may produce a line/rectangle beam shape for coating. This may be achieved by using a special optics that is capable of converting the laser beam from a single spot (input laser profile 1212) to a line/rectangle shape (output laser profile 1214) as shown in FIG. 12B.

Said special optics may be a laser beam positioning device 314 having a laser beam shaping device 1218. The laser beam shaping device 1218 may be a device having a fixed transmitted optics used to create a laser line/rectangle beam shape. The laser beam shaping device 1218 may comprise a collimation lens 1202, a cylindrical focus 1204 and a protection lens glass 1206. These may be used to create different laser line/rectangle dimensions depending on the collimation and cylindrical focal lengths. By creating the line/rectangular shaped beams, the current collector 304 may be coated in the X-direction faster than a process with a single spot laser beam shape would coat, as the laser line/rectangular shape width becomes wider. More specifically, the laser line/rectangular shape width may be bigger than the scan width and independent from scan frequency, which may make the coating process faster, and more controllable/simple by removing the laser beam scanning parameter. Thus, the Specific energy input may be as follows:

$$\text{Specific energy input}\left(\frac{J}{mm^2}\right) = \frac{\text{Laser Power (W)}}{\text{Beam scan width (mm)} \times \text{Coating speed}\left(\frac{mm}{min}\right)}.$$

Thus, a computer-aided method, system or apparatus, and computer program product are provided in the illustrative embodiments for electrode manufacturing and other related features, functions, or operations. Where an embodiment of a portion thereof is described with respect to a type of device, the computer-implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include the computer-readable storage medium (or media) having the computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, including but not limited to computer-readable storage devices as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Aspects of the present invention are described herein concerning flowchart illustrations and/or block diagrams of methods, apparatus (systems), and computer program products according to embodiments of the invention. It will be understood that computer readable program instructions can implement each block of the flowchart illustrations and/or block diagrams and combinations of blocks in the flowchart illustrations and/or block diagrams.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   providing a solvent-free powder comprising at least an electrode active material and a binder;
   determining a desired temperature to be produced at a location of application of a laser beam;
   selecting a scan frequency at which to control oscillation of the laser beam; and
   producing an electrode by feeding, via a powder feeder, the solvent-free powder onto a current collector and concurrently applying the laser beam to the solvent-free powder to melt the binder of the solvent-free powder at said desired temperature to produce a coating on the current collector;
   wherein the laser beam is operated as a continuous wave emission laser beam; and
   wherein the powder feeder applies the solvent-free powder in a direction perpendicular to a profile of the laser beam.

2. The method of claim 1, further comprising:
   determining a desired thickness of the coating and the desired temperature to be produced at the location of application of the laser beam to melt the binder.

3. The method of claim 2, wherein the desired thickness is based on a feed rate of the solvent-free powder and on a coating speed of the solvent-free powder.

4. The method of claim 2, wherein the desired temperature is based on a power or power density of the laser beam, a scan width of the laser, the selected scan frequency of the laser, and a coating speed of the solvent-free powder.

5. The method of claim 1, wherein the laser beam oscillates at the selected scan frequency to produce a coating width of up 10 mm in one pass of the laser beam, wherein the scan frequency ranges from 10 Hz to 200 Hz.

6. The method of claim 1, wherein the coating has a flat or ribbon shaped profile.

7. The method of claim 1, wherein one or more other laser beams are disposed adjacent to the laser beam to produce in a given duration a coating width that is wider than another coating width produced by the laser beam during said given duration.

8. The method of claim 1, wherein the powder feeder feeds the solvent-free powder in a coaxial powder feeding manner by applying the solvent-free powder coaxially to a profile of the laser beam.

9. The method of claim 1, wherein the electrode is a cathode.

10. The method of claim 1, wherein the electrode is an anode.

11. The method of claim 1, wherein current collector is disposed on a stationary base and the laser beam and powder feeder move in unison at the coating speed relative to a stationary base.

12. The method of claim 1, wherein the current collector is disposed on a moving base moving at the coating speed and the laser beam and powder feeder are stationary relative to the moving base.

13. The method of claim 1, wherein the electrode is produced in a vacuum-less environment.

14. The method of claim 1, wherein the binder is selected from the list consisting of polyvinylidene fluoride (PVDF), Polyacrylic acid (PAA), Polytetrafluoroethylene (PTFE), Polyurethane (PU), and Styrene-butadiene (SBR).

15. The method of claim 1, wherein the electrode is a cathode, and the active material comprises Lithium Iron Phosphate (LFP) or Lithium Manganese Oxide (LMO).

16. The method of claim 1, wherein the electrode is a cathode and the solvent-free powder further comprises a conductive additive.

17. The method of claim 1, wherein the electrode is an anode, and the active material comprises graphite.

18. The method of claim 1, wherein the desired temperature is a melting temperature of the binder.

19. The method of claim 1, wherein providing the solvent-free powder is responsive to mixing at least the electrode active material and the binder using a mixer.

20. The method of claim 1, wherein said feeding is responsive to preheating the current collector and/or solvent-free powder.

21. The method of claim 1, further comprising:
measuring a thickness of the coating at a selected surface of the coating; and
responsive to said measured thickness exceeding a defined threshold, automatically controlling one or more parameters of the laser beam and the powder feeder to maintain the desired thickness such that a new measured thickness of a newly created portion of the coating does not exceed the defined threshold.

22. An apparatus comprising:
a laser system comprising a laser welding head configured to deliver a laser beam, and a laser beam positioning device configured to control the laser beam to oscillate at a selected scan frequency; and
a powder feeder configured to feed a solvent-free powder comprising at least an electrode active material and a binder through a nozzle onto a current collector disposed on a base;
wherein the powder feeder feeds the solvent-free powder on the current collector, concurrently to oscillation of the laser beam such that application of the laser beam to the solvent-free powder at a defined temperature melts the binder of the solvent-free powder to produce a coating on the current collector,
wherein the laser beam is a continuous wave emission laser beam; and
wherein the powder feeder is configured to apply the solvent-free powder in a direction perpendicular to a profile of the laser beam.

23. The apparatus of claim 22, wherein the apparatus is configured as an off-axis powder feeding electrode manufacturing system.

24. The apparatus of claim 23, wherein the nozzle is a flat nozzle.

25. The apparatus of claim 22, wherein the apparatus is configured as a coaxial powder feeding electrode manufacturing system.

26. The apparatus of claim 22, wherein the laser welding head is coupled to the powder feeder and moves in unison with the powder feeder.

27. The apparatus of claim 22, wherein the current collector is disposed on a moving base that is configured to move relative to the laser beam and powder feeder.

28. The apparatus of claim 22, wherein the laser beam has a laser with wavelength of about 1070 nm; and the laser beam is further configured to oscillate at a selected scan width.

29. The apparatus of claim 22, wherein the current collector is a cathode current collector.

30. The apparatus of claim 29, wherein the solvent-free powder further comprises a conductive additive.

31. The apparatus of claim 22, wherein the current collector is an anode current collector.

32. The apparatus of claim 22, wherein the apparatus further comprises a housing in which the current collector and base are disposed.

33. The apparatus of claim 22, wherein the laser beam positioning device is a galvo mirror.

34. The apparatus of claim 22, wherein the laser beam is configured to have a defined scan width and laser power density.

35. The apparatus of claim 22, wherein the laser beam is produced using a laser device selected from the list consisting of a fiber laser, a disk laser, a diode laser and a $CO_2$ laser.

36. A computer system comprising:
a processor; and
a memory storing instructions that, when executed by the processor, configure the system to:
determine a desired temperature to be produced at a location of application of a laser beam;
control the laser beam to oscillate at a selected scan frequency;
produce an electrode by feeding, via a powder feeder, a solvent-free powder onto a current collector and concurrently applying the laser beam to the solvent-free powder to melt the binder of the solvent-free powder at said desired temperature to produce a coating on the current collector;
wherein the laser beam is operated as a continuous wave emission laser beam; and
wherein the powder feeder is configured to apply the solvent-free powder in a direction perpendicular to a profile of the laser beam.

37. The computer system of claim 36, wherein the laser beam is further configured to have a defined scan width and laser power density.

38. A non-transitory computer-readable storage medium storing instructions that when executed by a computer, cause the computer to:
determine a desired temperature to be produced at a location of application of a laser beam;
control a laser beam to oscillate at a selected scan frequency;
produce an electrode by feeding, via a powder feeder, a solvent-free powder onto a current collector and concurrently applying the laser beam to the solvent-free powder to melt the binder of the solvent-free powder at said desired temperature to produce a coating on the current collector; and
control the powder feeder to apply the solvent-free powder in a direction perpendicular to a profile of the laser beam;
wherein the laser beam is operated as a continuous wave emission laser beam.

39. The non-transitory computer-readable storage medium of claim 38, wherein the laser beam is further configured to have a defined scan width and laser power density.

40. An apparatus comprising:
a laser system comprising a laser welding head configured to deliver a laser beam, a laser beam shaping device configured to produce a line/rectangular beam and a laser beam positioning device configured to move and apply the laser beam; and
a powder feeder configured to feed a solvent-free powder comprising at least an electrode active material and a binder through a nozzle onto a current collector disposed on a base;
wherein the powder feeder feeds the solvent-free powder on the current collector, concurrently to application of the laser beam to the solvent-free powder at a defined temperature such that said application melts the binder of the solvent-free powder to produce a coating on the current collector,
wherein the powder feeder is configured to apply the solvent-free powder in a direction perpendicular to a profile of the laser beam, and
wherein the laser beam is a continuous wave emission laser beam.

* * * * *